(12) United States Patent
Chen et al.

(10) Patent No.: US 11,391,987 B2
(45) Date of Patent: Jul. 19, 2022

(54) BACKLIGHT MODULE AND DISPLAY APPARATUS

(71) Applicant: Coretronic Corporation, Hsin-Chu (TW)

(72) Inventors: Ping-Yen Chen, Hsin-Chu (TW); Chung-Yang Fang, Hsin-Chu (TW); Yang-Ching Lin, Hsin-Chu (TW); Jen-Wei Yu, Hsin-Chu (TW); Yu-Fan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/111,433

(22) Filed: Dec. 3, 2020

(65) Prior Publication Data

US 2021/0181580 A1    Jun. 17, 2021

(30) Foreign Application Priority Data

Dec. 11, 2019    (CN) .......................... 201911263904.2

(51) Int. Cl.
*G02F 1/13357* (2006.01)
*F21V 8/00* (2006.01)
*G02F 1/1335* (2006.01)

(52) U.S. Cl.
CPC ....... *G02F 1/133606* (2013.01); *G02B 6/003* (2013.01); *G02F 1/133536* (2013.01); *G02F 1/133607* (2021.01)

(58) Field of Classification Search
CPC ......... G02F 1/133606; G02F 1/133536; G02F 1/133607; G02B 6/003
See application file for complete search history.

(56) References Cited

U.S. PATENT DOCUMENTS

| 5,557,433 | A | * | 9/1996 | Maruyama | ........ | G02F 1/133524 |
| | | | | | | 349/5 |
| 7,784,954 | B1 | * | 8/2010 | Coleman | ................ | G02B 5/021 |
| | | | | | | 362/19 |
| 8,982,300 | B2 | | 3/2015 | Umemoto | | |

(Continued)

FOREIGN PATENT DOCUMENTS

| CN | 109212660 | 1/2019 |
| EP | 3355105 | 8/2018 |

(Continued)

*Primary Examiner* — Donald L Raleigh
(74) *Attorney, Agent, or Firm* — JCIPRNET

(57) ABSTRACT

A backlight module including a light guide plate, a light source, a prism sheet and a light absorbing sheet is provided. The light guide plate has a light incident surface, a light emitting surface connected to the light incident surface and a bottom surface opposite to the light emitting surface. At least one of the light emitting surface and the bottom surface of the light guide plate is disposed with a plurality of micro lens structures. The light source is disposed on a side of the light incident surface of the light guide plate. The prism sheet is overlapped with the light emitting surface of the light guide plate and has a plurality of prism structures facing the light emitting surface with an extending direction parallel to the light incident surface. The light absorbing sheet is disposed on a side of the bottom surface of the light guide plate.

6 Claims, 13 Drawing Sheets

(56) References Cited

U.S. PATENT DOCUMENTS

| | | | | |
|---|---|---|---|---|
| 2004/0042233 | A1* | 3/2004 | Suzuki | G02F 1/133615 362/561 |
| 2009/0180191 | A1* | 7/2009 | Yamada | G02B 5/045 359/625 |
| 2011/0025946 | A1* | 2/2011 | Wang | G02F 1/133606 349/62 |
| 2011/0051022 | A1* | 3/2011 | Kim | G02F 1/133606 349/15 |
| 2012/0086332 | A1* | 4/2012 | Matsui | H01L 27/322 313/506 |
| 2012/0105771 | A1* | 5/2012 | Oka | H04N 13/315 349/67 |
| 2014/0320784 | A1* | 10/2014 | Kweon | G02F 1/133615 349/65 |
| 2019/0369319 | A1* | 12/2019 | Oki | G02B 6/0063 |

FOREIGN PATENT DOCUMENTS

| | | |
|---|---|---|
| JP | H10206849 | 8/1998 |
| TW | I592722 | 7/2017 |

* cited by examiner

BACKLIGHT MODULE AND DISPLAY APPARATUS

CROSS-REFERENCE TO RELATED APPLICATION

This application claims the priority benefit of China application no. 201911263904.2, filed on Dec. 11, 2019. The entirety of the above-mentioned patent application is hereby incorporated by reference herein and made a part of this specification.

TECHNICAL FIELD

The invention relates to an optical module and a display apparatus, and in particular, relates to a backlight module and a display apparatus.

BACKGROUND

With the increasing application of non self-emissive displays such as liquid crystal displays, the design of backlight modules also needs to be adjusted for different uses. In order to improve a light energy utilization of light source, a backlight module disposed with a Brightness Enhancement Film (BEF) has become one of the mainstreams in the market. In general, this type of backlight module is disposed with a laminated structure of two brightness enhancement films (e.g., two prism lenses with extending directions orthogonal to each other), which can guide a light beam emitted from a light guide plate at a large angle to be within a specific angle range (e.g., −60 degrees to 60 degrees) covering a normal viewing angle, so as to improve a light intensity of the backlight module near the normal viewing angle. However, the backlight module adopting this double-layer BEF cannot satisfy a specification requirement of an anti-peep display apparatus for a high light collection of the backlight module.

In order to further improve the high light collection of the backlight module, a high light collection type backlight module adopting a reverse prism sheet as a replacement of the two stacked brightness enhancement films came into being. This type of backlight module can further improve a total light output near the normal viewing angle (i.e., to provide a light-condensing characteristic in a smaller angle range). However, because the light beam will go through reflection and/or refraction for multiple times in the light guide plate and the surface and the interior of the light guide plate will have small defects during to the manufacturing process, a part of the light beam transmitted in the light guide plate may be scattered and deviated from a light collection area to form an unexpected stray light, which makes a light collection effect worse than expected. Therefore, how to overcome the above problems has become a challenge that related manufacturers need to face when adopting such a high light collection backlight module.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a backlight module with excellent light collection, which can suppress the generation of stray light.

The invention provides a display apparatus with a higher total light output near a normal viewing angle and a better anti-peep effect at an oblique viewing angle.

Other objects and advantages of the invention can be further illustrated by the technical features broadly embodied and described as follows.

To achieve one, a part, or all of the objects or other objects, a backlight module is proposed according to an embodiment of the invention. The backlight module includes a light guide plate, a light source, a prism sheet and a light absorbing sheet. The light guide plate has a light incident surface, a light emitting surface connected to the light incident surface and a bottom surface opposite to the light emitting surface. At least one of the light emitting surface and the bottom surface of the light guide plate is disposed with a plurality of micro lens structures. The light source is disposed on a side of the light incident surface of the light guide plate. The prism sheet is overlapped with the light emitting surface of the light guide plate and has a plurality of prism structures facing the light emitting surface. An extending direction of the prism structures is parallel to the light incident surface of the light guide plate. The light absorbing sheet is disposed on a side of the bottom surface of the light guide plate. An absorbance of the light absorbing sheet within a wavelength range of visible light is higher than 70%.

To achieve one, a part, or all of the objects or other objects, an embodiment of the invention proposes a display apparatus. The display apparatus includes a display panel and a backlight module. The backlight module is overlapped with the display panel, and includes a light guide plate, a light source, a prism sheet and a light absorbing sheet. The light guide plate has a light incident surface, a light emitting surface connected to the light incident surface and a bottom surface opposite to the light emitting surface. At least one of the light emitting surface and the bottom surface of the light guide plate is disposed with a plurality of micro lens structures. The light source is disposed on a side of the light incident surface of the light guide plate. The prism sheet is overlapped with the light emitting surface of the light guide plate and has a plurality of prism structures facing the light emitting surface. An extending direction of the prism structures is parallel to the light incident surface of the light guide plate. The light absorbing sheet is disposed on a side of the bottom surface of the light guide plate. An absorbance of the light absorbing sheet within a wavelength range of visible light is higher than 70%.

Based on the above, in the backlight module according to an embodiment of the invention, with the light absorbing sheet disposed on one side of the bottom surface of the light guide plate and the absorption of the light absorbing sheet within the wavelength range of visible light higher than 70%, the influence of stray light on the light output type of the backlight module may be effectively suppressed to improve the light collection of the backlight module. On the other hand, the light output of the display apparatus using the backlight module in the side view angle can be effectively reduced, thereby improving the anti-peep performance of the display apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
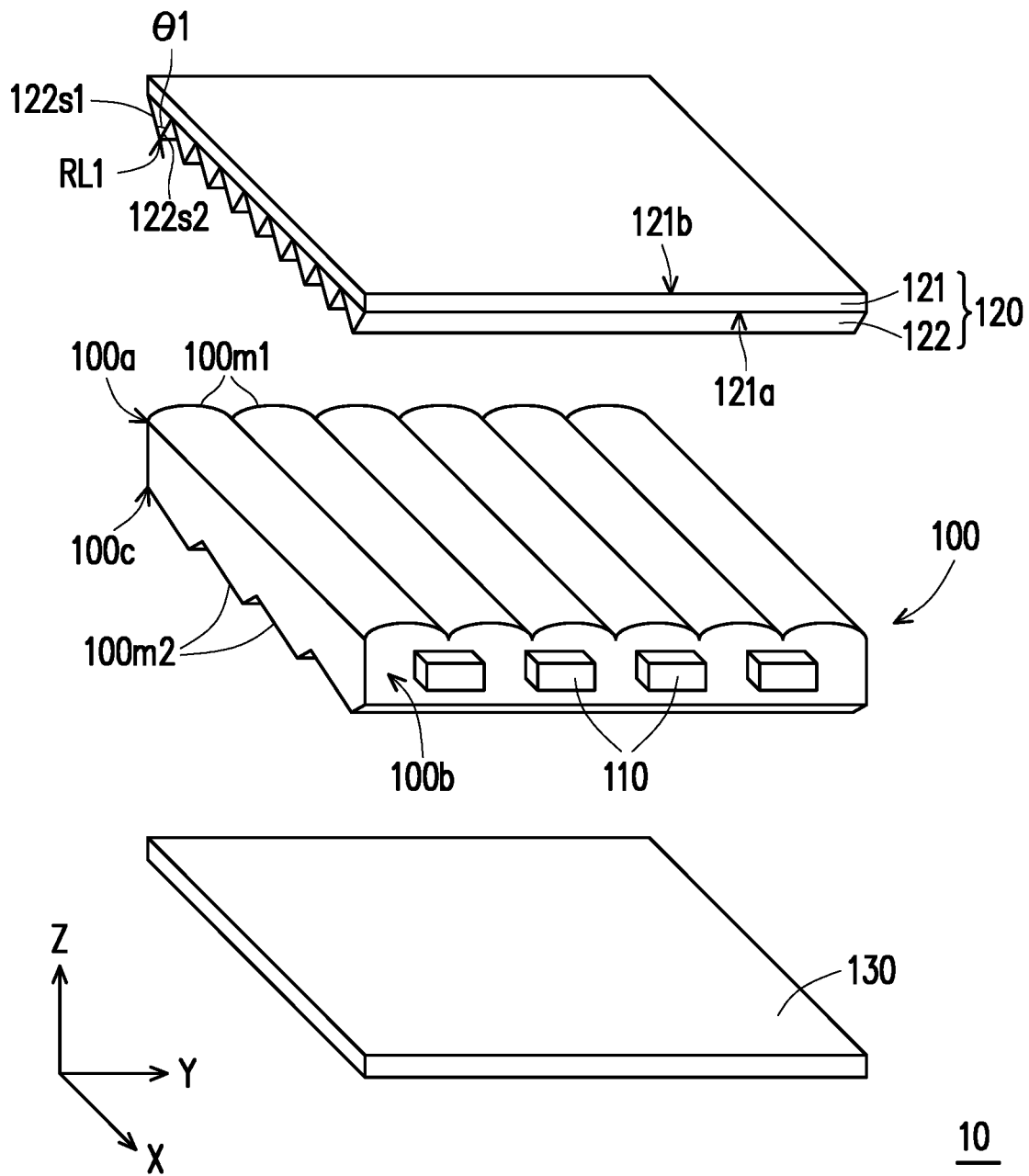
FIG. 1 is a schematic diagram of a backlight module in a first embodiment of the invention.
Figure 2:
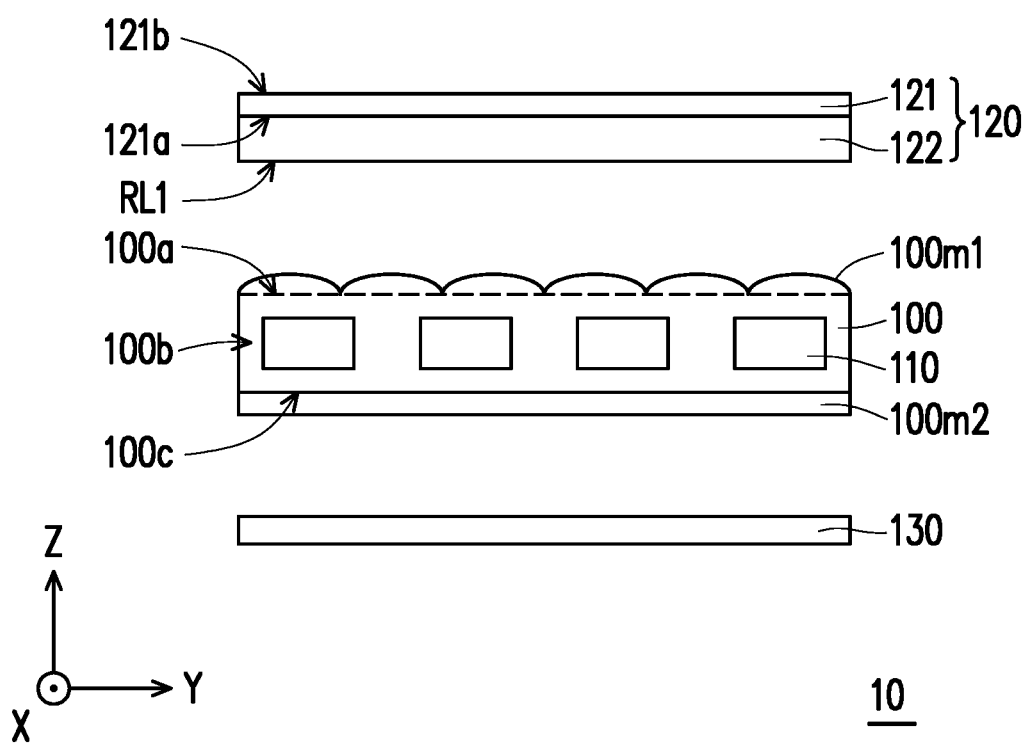
FIG. 2 is a side view of the backlight module of FIG. 1.

FIG. 1 is a schematic diagram of a backlight module in a first embodiment of the invention. FIG. 2 is a side view of the backlight module of FIG. 1. Referring to FIG. 1 and FIG. 2, a backlight module 10 includes a light guide plate 100, a light source 110, a prism sheet 120 and a light absorbing sheet 130. The light guide plate 100 has a light incident surface 100b, a light emitting surface 100a connected to the light incident surface 100b and a bottom surface 100c opposite to the light emitting surface 100a. The prism sheet 120 is overlapped with the light guide plate 100, and the prism sheet 120 is disposed on a side of the light emitting surface 100a of the light guide plate 100. The light source 110 is disposed on a side of the light incident surface 100b of the light guide plate 100. That is, the backlight module 10 of the embodiment is an edge type backlight module. It should be noted that in this embodiment, the number of the light sources 110 is exemplarily described by taking four as an example, but the invention is not limited by the disclosure of the drawings. In other embodiments, the number of the light sources 110 may be adjusted according to an optical design of the backlight module.

Further, the prism sheet 120 includes a substrate 121 and a plurality of prism structures 122 facing the light emitting surface 100a. The substrate 121 has a light incident side 121a and a light emitting side 121b opposite to each other. The light incident side 121a faces the light guide plate 100, and the prism structures 122 are disposed on the light incident side 121a of the substrate 121. In this embodiment, materials of the substrate 121 and the prism structures 122 may include polyethylene terephthalate (PET), polycarbonate (PC), UV glue, other suitable polymers, or a combination of the above materials.

In this embodiment, the prism structures 122 of the prism sheet 120 may be arranged on the substrate 121 along a direction X and extending in a direction Y. In other words, an extending direction of the prism structures 122 is parallel to the light incident surface 100b of the light guide plate 100. On the other hand, a cross-sectional profile of the prism structure 122 on a plane (i.e., an XZ plane) perpendicular to the extending direction (i.e., the direction Y) may be a triangle. That is, the prism structures 122 of this embodiment may be triangular prism strips, but the invention is not limited thereto. In other embodiments, the cross-sectional profile of the prism structure 122 on the XZ plane may also be adjusted according to actual light type requirements (or light splitting effect). More specifically, each of the prism structures 122 has a first inclined surface 122s1 and a second inclined surface 122s2 opposite to each other. A ridge line RL1 of the prism structure 122 is defined at a junction of the first inclined surface 122s1 and the second inclined surface 122s2, and the ridge line RL1 may extend in the direction Y.

On the other hand, a first vertex angle θ1 is provided between the first inclined surface 122s1 and the second inclined surface 122s2 of the prism structure 122, and the first vertex angle θ1 of the prism structure 122 may fall between 60 degrees and 75 degrees. However, the invention is not limited in this regard. When the first vertex angle θ1 of the prism structure 122 is designed to fall between 60 degrees and 75 degrees, a light emitting brightness of the backlight module 10 near the normal viewing angle (e.g., a viewing angle range between −15 degrees and 15 degrees) is higher than a light emitting brightness of a backlight module provided without the prism sheet 120.

Furthermore, the light guide plate 100 has a plurality of micro lens structures 100m1 and a plurality of micro lens structures 100m2, and the micro lens structures 100m1 and the micro lens structures 100m2 are disposed on the light emitting surface 100a and the bottom surface 100c of the light guide plate 100, respectively. However, the invention is not limited in this regard. In other embodiments, the micro lens structures may also be disposed on only one of the light emitting surface and the bottom surface of the light guide plate according to the actual light type requirements.

In this embodiment, the micro lens structures 100m1 of the light guide plate 100 are arranged on the light emitting surface 100a along the direction Y, and an extending direction of the micro lens structures 100m1 is perpendicular to the light incident surface 100b of the light guide plate 100 (i.e., the direction X). The micro lens structures 100m2 of the light guide plate 100 are arranged on the bottom surface 100c along the direction X, and an extending direction of the micro lens structures 100m2 is parallel to the light incident surface 100b of the light guide plate 100 (i.e., the direction Y). In other words, the extending direction of the micro lens structures 100m1 may be perpendicular to the extending direction of the micro lens structures 100m2, but the invention is not limited thereto. According to other embodiments, depending on the actual light type requirements, the extending direction of the micro lens structures 100m1 of the light guide plate 100 may not be perpendicular to the light incident surface 100b of the light guide plate 100 but intersected with the extending direction of the micro lens structures 100m2.

On the other hand, a cross-sectional profile of the micro lens structure 100m1 of the light guide plate 100 on a plane (i.e., a YZ plane) perpendicular to the extending direction (i.e., the direction X) may be a semi-oval shape. That is, the micro lens structures 100m1 of this embodiment may be rod lens strips, but the invention is not limited thereto. In other embodiments, the cross-sectional profile of the micro lens structure 100m1 on the plane perpendicular to the extending direction may also be adjusted according to actual light type requirements (or light splitting effect). A cross-sectional profile of the micro lens structure 100m2 of the light guide plate 100 on a plane (i.e., an XZ plane) perpendicular to the extending direction (i.e., the direction Y) may be a wedge. That is, the micro lens structures 100m2 may be (inclined) triangular lens strips, but the invention is not limited thereto. In other embodiments, the cross-sectional profile of the micro lens structures 100m2 on the plane perpendicular to the extending direction may also be adjusted according to actual light type requirements (or light splitting effect).

It should be noted that, the number of the micro lens structures of the light guide plate 100 in this embodiment is only for illustrative purposes, and is not intended to limit the invention. In other embodiments, the number of the micro lens structures of the light guide plate may also adjusted according to actual design requirements (e.g., the configuration relationship with the light source or the size of the light guide plate).

More specifically, the light absorbing sheet 130 of the backlight module 10 is disposed on a side of the bottom surface 100c of the light guide plate 100. In details, after being transferred by the light guide plate 100, most of the light beam emitted by the light source 110 may be emitted from the light emitting surface 100a and focused near the normal viewing angle (e.g., the viewing angle range between −15 degrees and 15 degrees; total viewing angle range of about 30 degrees). Nonetheless, after going though reflection (e.g., total internal reflection) and/or refraction for multiple times in the light guide plate 100, with unexpected scattering or diffusion due to small defects in the surface and the interior of the light guide plate 100, a part of the light beam may be emitted from the bottom surface 100c, and reflected again (e.g., reflected by backplate, mirror reflection sheet, or frame) to the light emitting surface 100a to be emitted. Based on the above, by making an absorbance of the light absorbing sheet 130 within a wavelength range of visible light higher than 70%, the unexpected light beam emitted from the bottom surface 100c may be effectively absorbed. Although such action may affect a maximum light emitting brightness of the light guide plate 100, the influence of the stray light on the light output type of the backlight module may be effectively reduced so as to further improve a light collection of the backlight module. In a more preferable embodiment, the absorption of the light absorbing sheet 130 within the wavelength range of visible light may selectively be higher than 90%.

Figure 3:
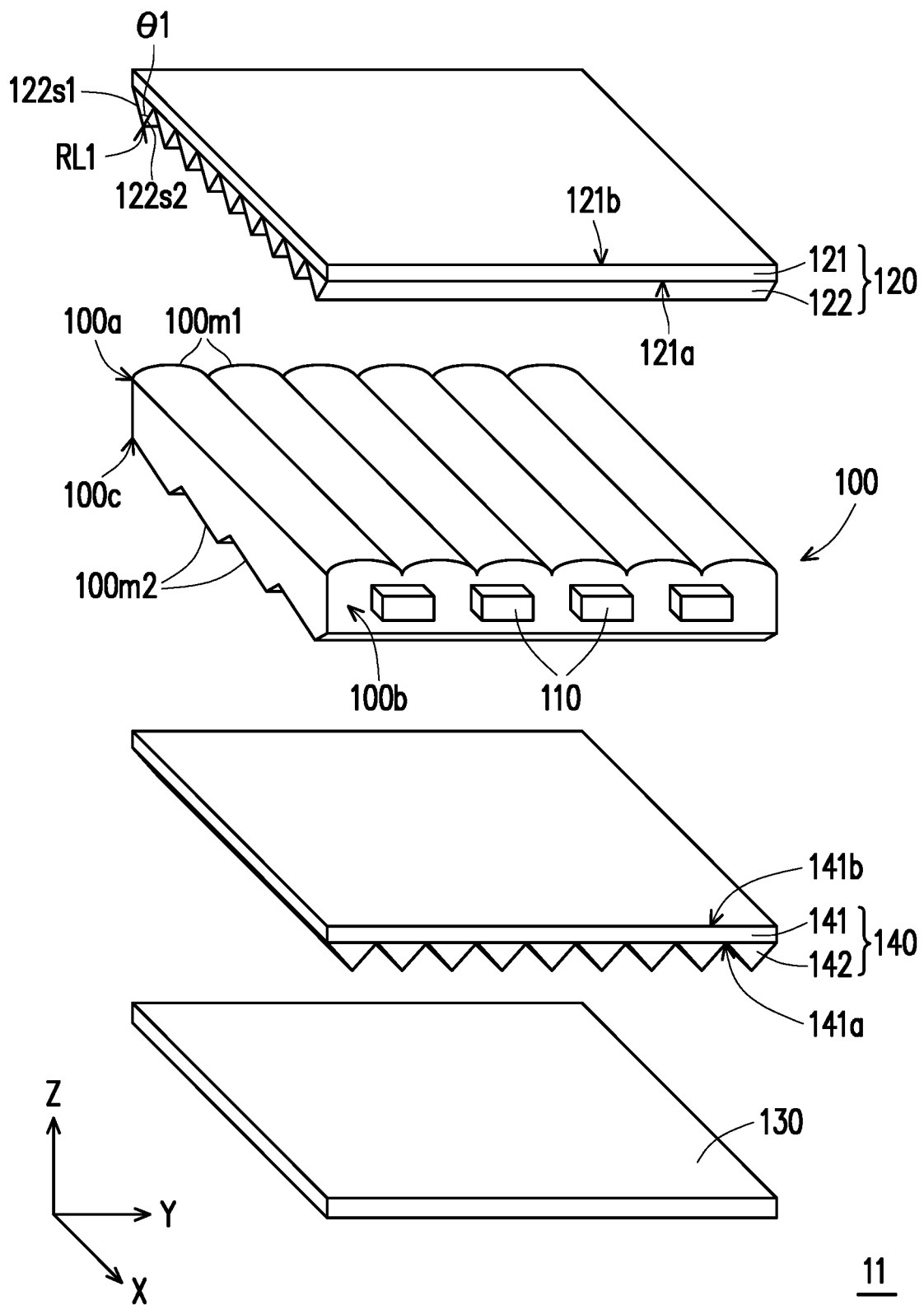
FIG. 3 is a schematic diagram of a backlight module in a second embodiment of the invention.
Figure 4:
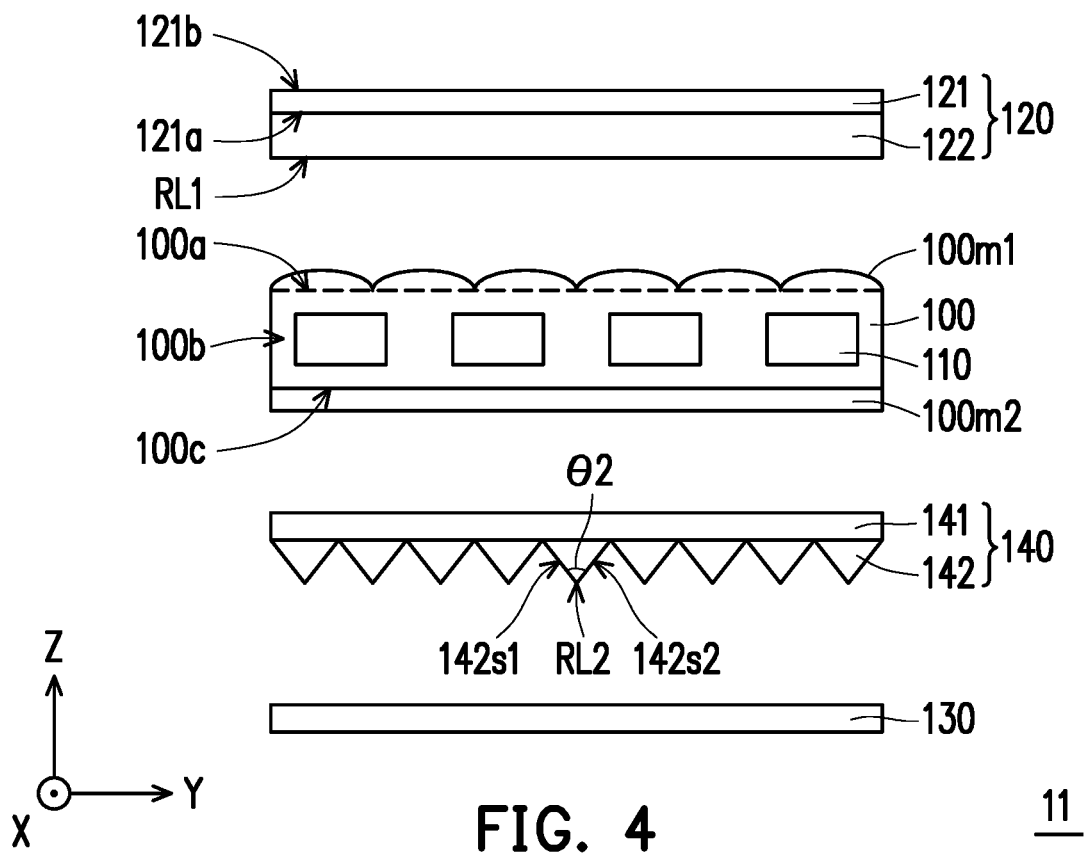
FIG. 4 is a side view of the backlight module of FIG. 3.
Figure 5:
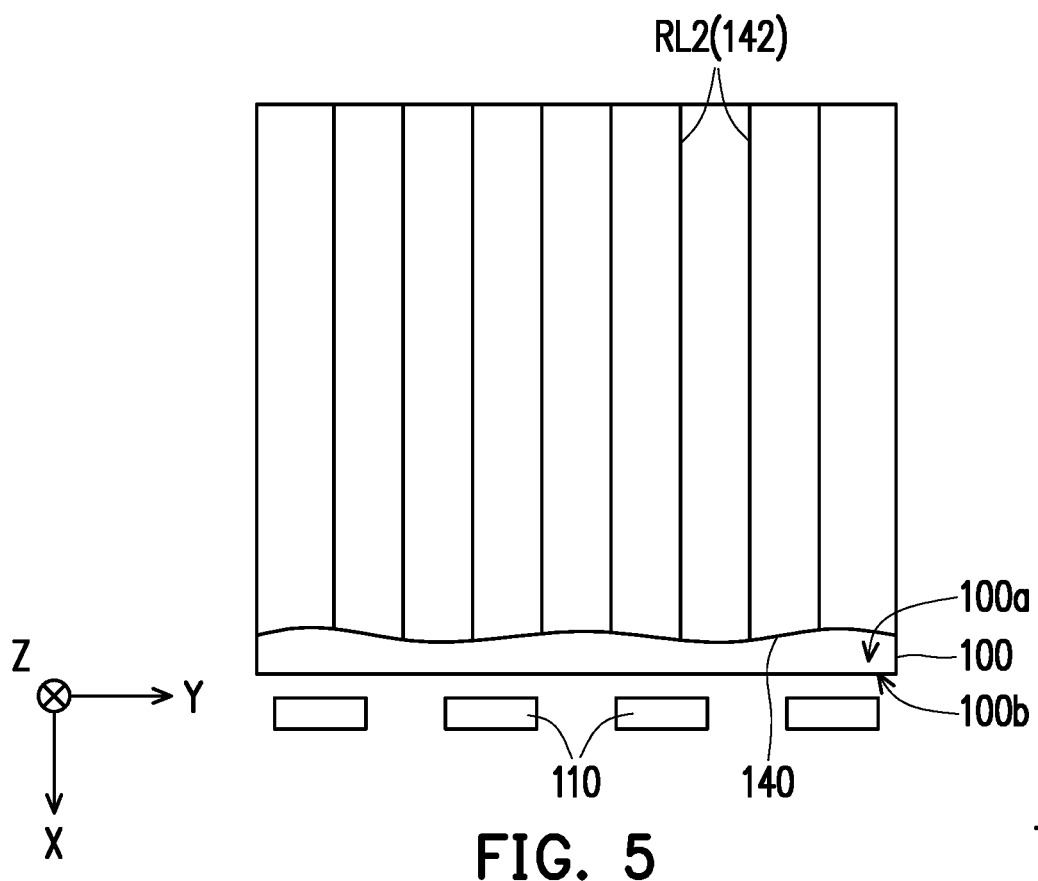
FIG. 5 is a bottom view of the backlight module of FIG. 3.

FIG. 3 is a schematic diagram of a backlight module in a second embodiment of the invention. FIG. 4 is a side view of the backlight module of FIG. 3. FIG. 5 is a bottom view of the backlight module of FIG. 3. Referring to FIG. 3 and FIG. 4, the major difference between a backlight module 11 of this embodiment and the backlight module 10 of FIG. 1 is the different composition of the backlight module. In order to further increase a total light output of the backlight module near the normal viewing angle (e.g., the viewing angle range between −15 degrees and 15 degrees), the backlight module 11 of this embodiment further includes an optical film 140 disposed between the light guide plate 100 and the light absorbing sheet 130.

The optical film 140 includes a substrate 141 and a plurality of optical micro structures 142 facing the light absorbing sheet 130. The substrate 141 includes a first side 141a and a second side 141b opposite to each other. The first side 141a faces the light absorbing sheet 130, and the optical micro structures 142 are disposed on the first side 141a of the substrate 141. In this embodiment, materials of the substrate 141 and the optical micro structure 142 may include polyethylene terephthalate (PET), polycarbonate (PC), UV glue, other suitable polymers, or a combination of the above materials.

In this embodiment, referring to FIG. 5, the optical micro structures 142 of the optical film 140 may be arranged on the first side 141a of the substrate 141 along the direction Y, and an extending direction of the optical micro structures 142 may selectively be perpendicular to the light incident surface 100b of the light guide plate 100. It should be noted that, for clarity of presentation, FIG. 5 only illustrates the light guide plate 100, the light source 110 and the optical micro structures 142 of the optical film 140 of FIG. 3. However, the invention is not limited in this regard. According to other embodiments, it is also possible that the extending direction of the optical micro structures 142 is not perpendicular to the light incident surface 100b of the light guide plate 100. Further, a cross-sectional profile of optical micro structure 142 on a plane (i.e., the YZ plane) perpendicular to the extending direction (i.e., the direction X) may be a triangle. That is, the optical micro structures 142 of the present embodiment may be triangular prism strips.

More specifically, referring to FIG. 4, each of the optical micro structures 142 has a first inclined surface 142s1 and a second inclined surface 142s2 opposite to each other. A ridge line RL2 is defined at a junction of the first inclined surface 142s1 and the second inclined surface 142s2 of the optical micro structure 142, and the ridge line RL2 may extend in the direction X. That is, a cross-sectional profile of optical micro structures 142 on a plane (i.e., the YZ plane) perpendicular to the extending direction may be a triangle. However, the invention is not limited in this regard. In other embodiments, the cross-sectional profile of the optical micro structure 142 on the plane perpendicular to the extending direction may also be adjusted according to actual light type requirements (or light splitting effect). On the other hand, a second vertex angle θ2 is provided between the first inclined surface 142s1 and the second inclined surface 142s2 of the optical micro structure 142, and the second vertex angle θ2 of the optical micro structure 142 may fall between 80 degrees and 140 degrees. However, the invention is not limited in this regard. Further, when the light hits the optical micro structure 142 of the optical film 140, if a projection of a travelling direction of the light on the light emitting surface 100a is parallel to a projection of the ridge line RL2 on the light emitting surface 100a or there is a small angle included in between the two, the light is reflected by the optical micro structure 142 and transmitted towards the light emitting surface 100a; otherwise, the light penetrates the optical micro structure 142 and is absorbed by the light absorbing sheet 130. In this way, a proportion of the light being reflected and transmitted by the optical micro structure 142 may be controlled by designing the cross-sectional profile of the optical micro structure 142 or the direction of the ridge line RL2.

Figure 6:
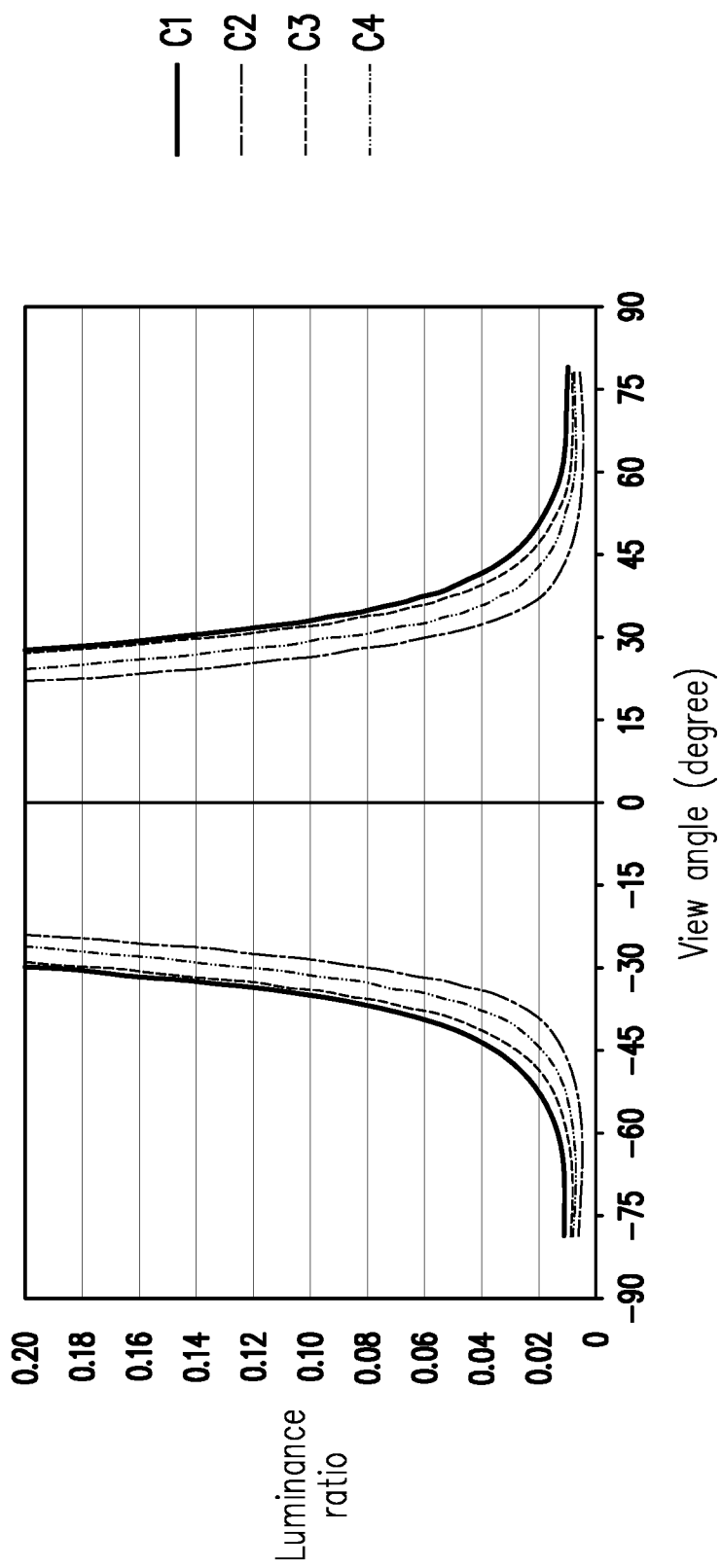
FIG. 6 is a curve diagram of viewing angle versus luminance ratio of the backlight modules of FIG. 1 and FIG. 3.

FIG. 6 is a graph of the viewing angle versus luminance ratio of the four backlight modules of FIG. 1 and FIG. 3, where a curve C1, a curve C2, a curve C3 and a curve C4 respectively show changes in the luminance ratio of the four backlight modules at different viewing angles. Specifically, the curve C1 corresponds to a backlight module provided without the light absorbing sheet 130 and the optical film 140; the curve C2 corresponds to the backlight module 10 provided with the light absorbing sheet 130 but without the optical film 140; the curve C3 corresponds to the backlight module 11 provided with the light absorbing sheet 130 and the optical film 140 having the second vertex angle θ2 of the optical micro structure 142 being 90 degrees; and the curve C4 corresponds to the backlight module 11 provided with the light absorbing sheet 130 and the optical film 140 having the second vertex angle θ2 of the optical micro structure 142 being 140 degrees. It should be noted that the luminance ratio herein is a ratio of the light emitting brightness of each backlight module at each viewing angle to the light emitting brightness of each backlight module at the normal viewing angle (i.e., when the viewing angle is 0 degree, for example, normalized to 1). In addition, the backlight module provided without the light absorbing sheet 130 is, for example, a backlight module with a mirror reflection sheet disposed on a side of the bottom surface of the light guide such as the 3M product called ESR (Enhanced Specular Reflector).

Referring to FIG. 4 and FIG. 6, when the second vertex angle θ2 is designed to fall between 80 degrees and 140 degrees (e.g., at 90 degrees or 140 degrees), the light emitting luminance ratios of the backlight module 11 at the viewing angle of 45 degrees (e.g., as shown by the curve C3 and the curve C4, where the second vertex angles θ2 are 140 degrees and 90 degrees, respectively) are lower than the light emitting luminance ratio of the backlight module provided without the light absorbing sheet 130 (as shown by the curve C1). The light emitting luminance ratios of the backlight module 11 at the viewing angle of 45 degrees (e.g., as shown by the curve C3 and the curve C4) are higher than the light emitting luminance ratio of the backlight module 10 provided with the light absorbing sheet 130 but without the optical film 140 (as shown by the curve C2). Therefore, as can be learnt from FIG. 6 that under the architecture of the backlight module 11 of FIG. 3, with the light emitting luminance ratio and a maximum brightness taken into consideration, if an optimal design value of the second vertex angle θ2 of the optical micro structure 142 is 90 degrees, the anti-peep effect may be better than a common backlight module and the backlight module 10.

It should be noted that the viewing angle (e.g. the viewing angle of 45 degrees) selected for determining the optimal design value of the second vertex angle θ2 is determined according to an optical specification (i.e., inspection item) of an anti-peep display apparatus. In other embodiments, the viewing angle selected for determining the optimal design value of the second vertex angle θ2 may also be adjusted according to use of the backlight module.

Some other embodiments are provided below to explain the disclosure in detail. Reference numerals in the foregoing embodiments are used in the following embodiments to indicate identical or similar components, and repeated description of the same technical contents is omitted. The omitted description can refer to the foregoing embodiment, which is not repeated hereinafter.

Figure 7:
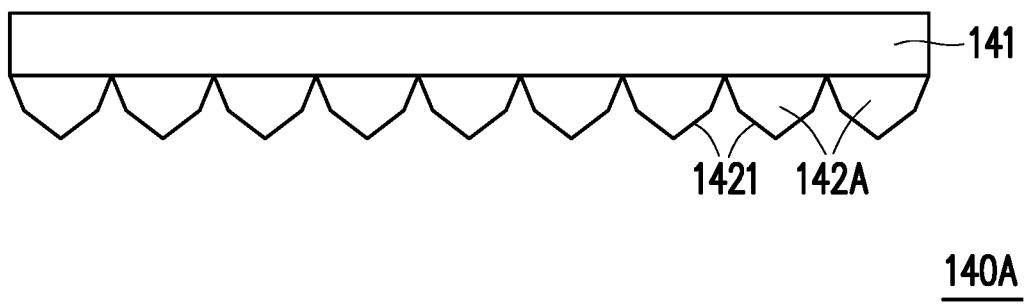
FIG. 7 is a cross-sectional view of an optical film according to another embodiment of the invention.
Figure 8:
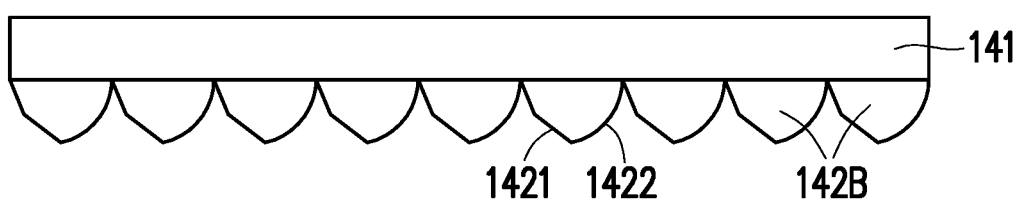
FIG. 8 is a cross-sectional view of an optical film according to yet another embodiment of the invention.

FIG. 7 is a cross-sectional view of an optical film according to another embodiment of the invention. FIG. 8 is a cross-sectional view of an optical film according to yet another embodiment of the invention. Referring to FIG. 7 and FIG. 8, the difference between an optical film 140A (as shown in FIG. 7), an optical film 140B (as shown in FIG. 8) and the optical film 140 (as shown in FIG. 4) is the configuration of the optical micro structures, Specifically, each of the optical micro structures of the optical films 140, 140A and 140B has one vertex angle. A cross-sectional profile of an optical micro structure 142A of the optical film 140A on the YZ plane is a combination of multiple straight line segments 1421 (i.e., polylines). A cross-sectional profile of an optical micro structure 142B of the optical film 140B of the YZ plane is a combination of a straight line segment 1421 and an arc segment 1422. However, the invention is not limited in this regard. In other embodiments, the cross-sectional profile of the optical micro structure of the optical film on the YZ plane may also be adjusted according to different optical design requirements.

Figure 9:
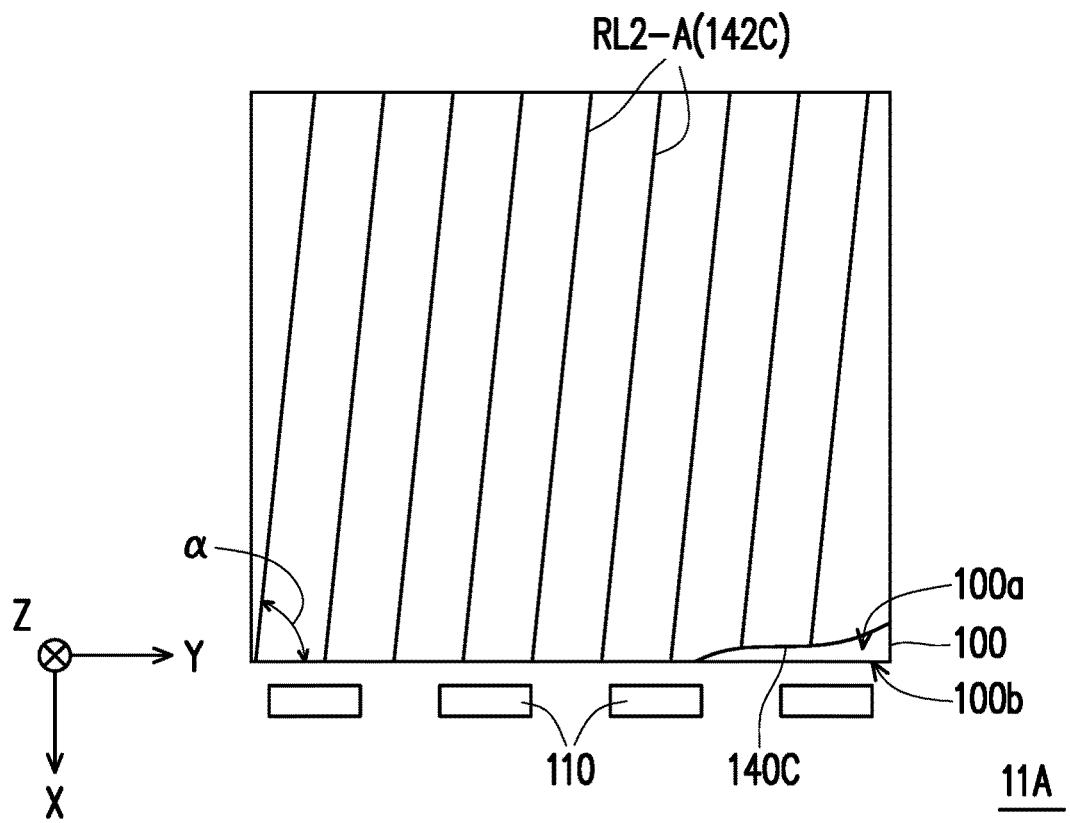
FIG. 9 is a bottom view of a backlight module in a third embodiment of the invention.
Figure 10:
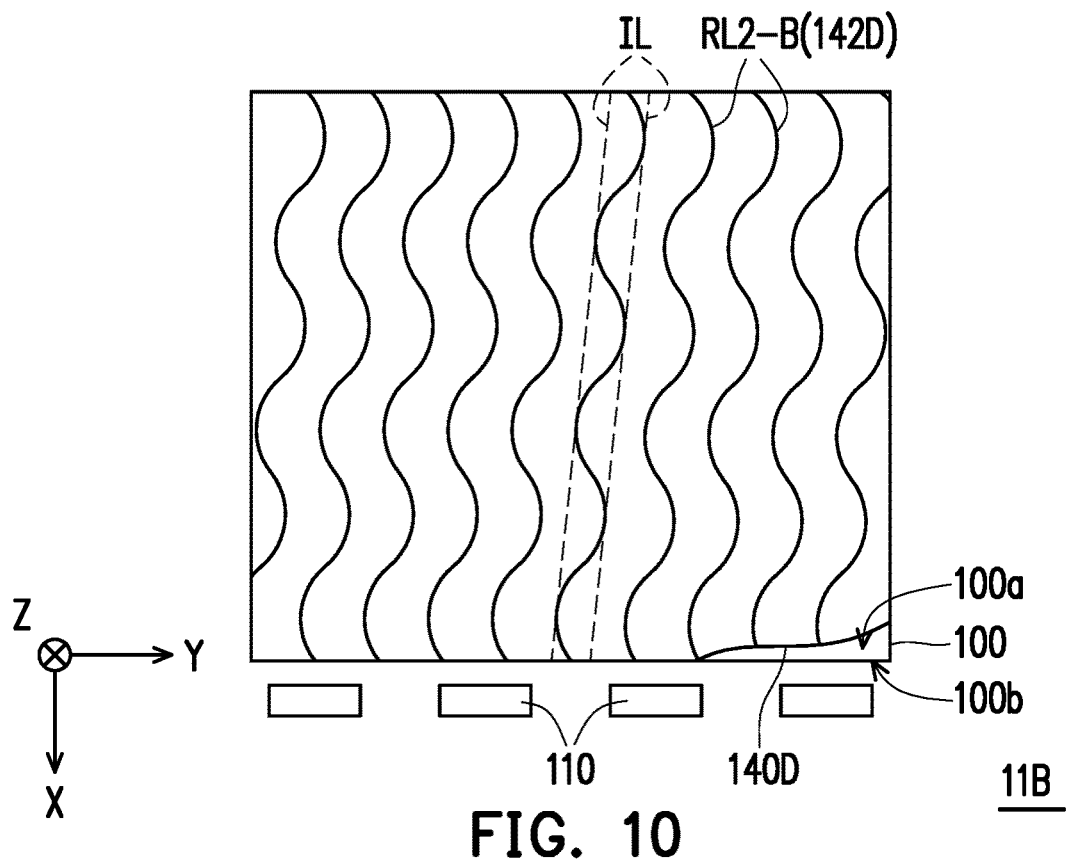
FIG. 10 is a bottom view of a backlight module in a forth embodiment of the invention.

FIG. 9 is a bottom view of a backlight module in a third embodiment of the invention. FIG. 10 is a bottom view of a backlight module in a forth embodiment of the invention. In particular, for clarity of presentation, FIG. 9 and FIG. 10 only illustrate the light guide plate 100, the light source 110, optical micro structures 142C of an optical film 140C, and optical micro structures 142D of an optical film 140D. Referring to FIG. 9, the difference between a backlight module 11A of this embodiment and the backlight module 11 of FIG. 5 is the extending direction of the optical micro structures. In this embodiment, a normal projection of a ridge line RL2-A of the optical micro structure 142C of the optical film 140C (i.e., an extending path) on the light emitting surface 100a of the light guide surface 100 is not perpendicular to the light incident surface 100b of the light guide plate 100. Specifically, an included angle α is provided between the extending direction of the optical micro structure 142C (or the ridge line RL2-A) and the light incident surface 100b of the light guide plate 100, and the included angle α is between 75 degrees and 105 degrees. Accordingly, the bright and dark lines (i.e., the moiré pattern) produced between the optical film 140C and the micro lens structures 100m1 (as shown in FIG. 3) of the light guide plate 100 may be effectively suppressed. In other words, a light output uniformity of the backlight module 11A may be improved.

Referring to FIG. 10, the difference between a backlight module 11B of this embodiment, the backlight module 11 of FIG. 5 and the backlight module 11A of FIG. 9 is the different configuration of the optical micro structures. In this embodiment, a normal projection of a ridge line RL2-B of the optical micro structure 142D of the optical film 140D (i.e., the extending path) on the light emitting surface 100a of the light guide surface 100 is wavy.

Specifically, although the extending path of the optical microstructure 142D is wavy, the normal projection of the ridge line RL2-B on the light guide plate 100 is still limited between two virtual straight lines IL, and an extending direction of the two virtual straight lines IL are still substantially identical to the extending direction of the optical micro structures 142C of FIG. 9. In other words, since the extending direction of the optical micro structures 142D is substantially identical to the extending direction of the optical micro structures 142C of FIG. 9, an included angle between the virtual straight line IL and the light incident surface 100b of the light guide plate 100 may fall between, for example, 75 degrees and 105 degrees.

It is worth mentioning that, because the normal projection of the optical micro structure 142D on the light emitting surface 100a of the light guide plate 100 has the curved profile (i.e., wavy), the bright and dark lines (i.e., the moiré pattern) produced between the optical film 140D, the prism sheet (e.g., the prism sheet 120 shown in FIG. 3) and the micro lens structures of the light guide plate 100 (e.g., the micro lens structures 100m1 and the micro lens structures 100m2) may be effectively suppressed. In other words, a light output uniformity of the backlight module 11B may be improved. In addition, when the backlight module 11B is overlapped with a display panel (shown in FIG. 14), the optical micro structures 142D with a wavy structure may also suppress the bright and dark lines (i.e., mura) produced between the optical film 140D and the display panel.

Figure 11:
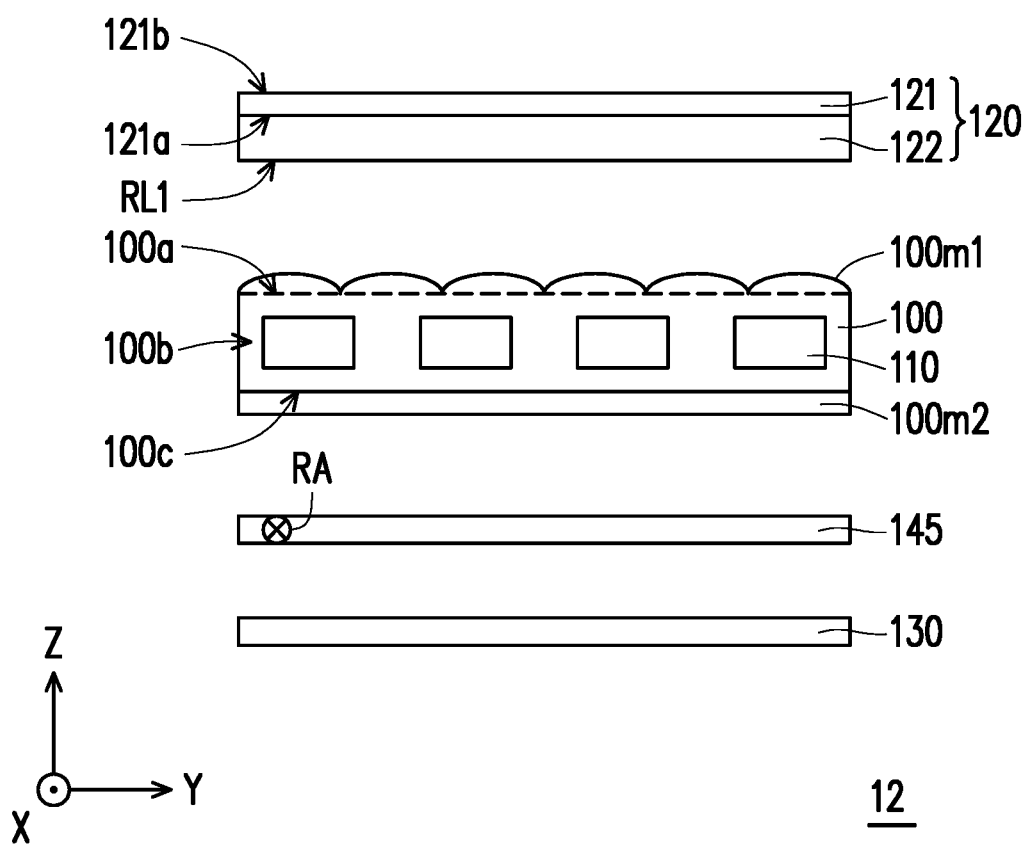
FIG. 11 is a bottom view of a backlight module in a fifth embodiment of the invention.

FIG. 11 is a bottom view of a backlight module in a fifth embodiment of the invention. Referring to FIG. 11, the difference between a backlight module 12 of this embodiment and the backlight module 11 in FIG. 4 is the different type of the optical film. In this embodiment, an optical film 145 disposed between the light absorbing sheet 130 and the light guide plate 100 is, for example, a reflective polarizer. An included angel between a reflection axis RA of the reflective polarizer (i.e., the optical film 145) and the light incident surface 100b of the light guide plate 100 may fall between 70 degrees and 110 degrees, and more preferably, at 90 degrees. However, the invention is not limited in this regard. For example, this reflective polarizer (i.e., the optical film 145) may have a higher reflectance for a light beam with a traveling direction substantially parallel to the reflection axis RA, and have a lower reflectance for a light beam with a traveling direction substantially perpendicular to the reflection axis RA. This reflective polarizer has a lowest reflectance (viewing angle) at an oblique viewing angle in a range of 50 degrees to 60 degrees. However, the invention is not limited in this regard. In other embodiments, a reflectance distribution of the reflective polarizer for different viewing angles may also be adjusted according to the actual light type requirements.

Figure 12:
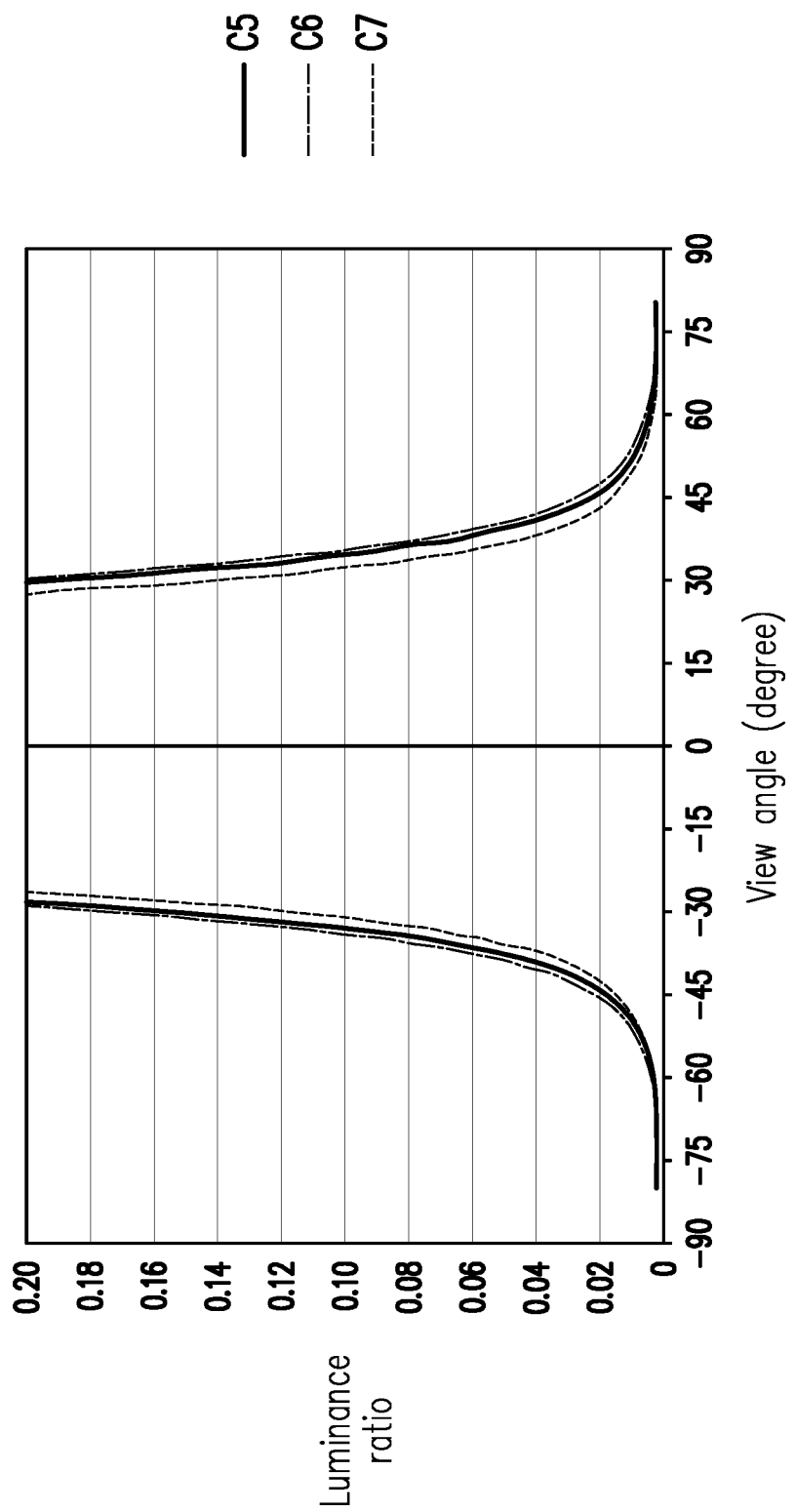
FIG. 12 is a curve diagram of viewing angle versus luminance ratio of the backlight modules of FIG. 1, FIG. 3 and FIG. 11.

FIG. 12 is a graph of the viewing angle versus luminance ratio of the three backlight modules of FIG. 1, FIG. 3 and FIG. 11, where a curve C5, a curve C6 and a curve C7 respectively show changes in the luminance ratio of the three backlight modules at different viewing angles. Specifically, the curve C5 corresponds to the backlight module 12 provided with the light absorbing sheet 130 and the optical film 145; the curve C6 corresponds to the backlight module 11 provided with the light absorbing sheet 130 and the optical film 140 having the second vertex angle θ2 of the optical micro structure 142 being 90 degrees; and the curve C7 corresponds to the backlight module 10 provided with the light absorbing sheet 130 but without the optical film 140. It should be noted that the luminance ratio herein is a ratio of the light emitting brightness of each backlight module at each viewing angle to the light emitting brightness of each backlight module at the normal viewing angle.

Referring to FIG. 11 and FIG. 12, when the optical film 145 (e.g., the reflective polarizer) is disposed between the light guide plate 100 and the light absorbing sheet 130 of the backlight module 12, the light emitting luminance ratio of the backlight module 12 near the viewing angle of 45 degrees (e.g., as shown by the curve C5) is clearly lower than the light emitting luminance ratio of the backlight module 11 near the viewing angle of 45 degrees (as shown by the curve C6). In other words, as can be seen from FIG. 12 that under the structure of the backlight module 12 of FIG. 11, the light output of the backlight module at the oblique viewing angle (e.g., the viewing angle of 45 degrees) may be reduced to improve the anti-peep effect. Meanwhile, with the setting of the reflective polarizer, a light output loss of the backlight module near the normal viewing angle (e.g., the viewing angle range of −15 degrees to 15 degrees) may be reduced. In other words, the light collection of the backlight module may be improved accordingly.

Figure 13:
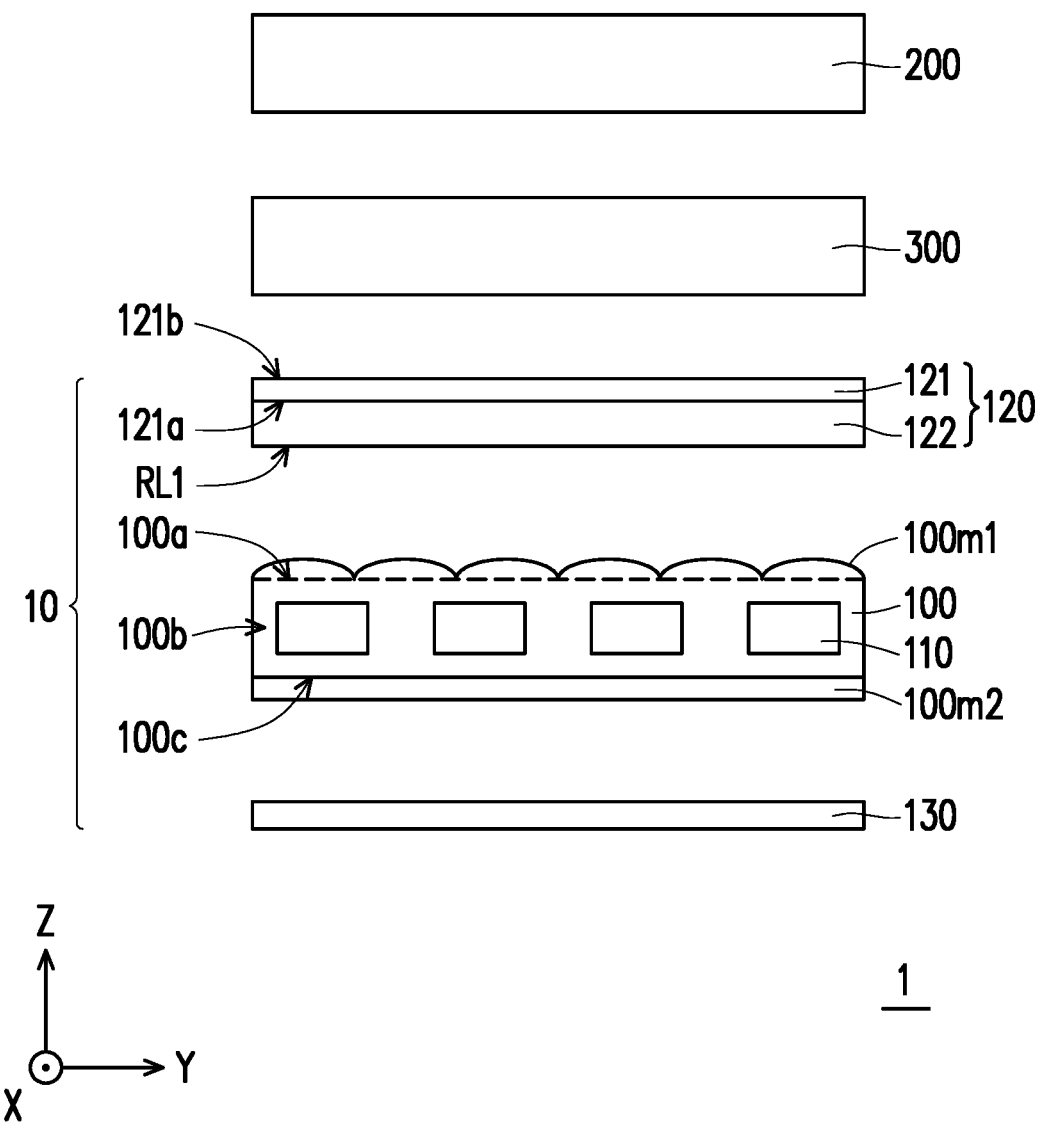
FIG. 13 is a side view of a display apparatus in an embodiment of the invention.

FIG. 13 is a side view of a display apparatus in an embodiment of the invention. Referring to FIG. 2 and FIG. 13, a display apparatus 1 may include the backlight module 10, a display panel 200 and an electrically controlled diffusion film 300. In addition, the display panel 200 and the electrically controlled diffusion film 300 are overlapped with the light emitting surface 100a of the light guide plate 100. Here, the electrically controlled diffusion film 300 is overlapped with the display panel 200 and located between the display panel 200 and the backlight module 10. More specifically, the display apparatus 1 of this embodiment can provide a switchable anti-peep function. However, the disclosure is not limited in this regard. In other embodiments, it is also possible that the display apparatus does not have the electrically controlled diffusion film 300. In such case, the display apparatus can provide the anti-peep effect compared to the general displays but cannot provide the effect of switching between a sharing mode and an anti-peep mode. In this embodiment, the display panel 200 is, for example, a liquid crystal display (LCD) panel, an electrophoretic display (EPD) panel or other non self-emissive display panels. In this embodiment, the electrically controlled diffusion film 300 is, for example, a polymer dispersed liquid crystal (PDLC) film, a polymer network liquid crystal (PNLC) film, a liquid crystal lens (LC Lens), or other structures that can change the degree of light beam divergence by electrical control.

Further, the display apparatus 1 may adjust a light pattern of the light beam emitted from the backlight module 10 through the electrically controlled diffusion film 300. For example, in the sharing mode, the light beam emitted from the backlight module 10 at a small angle (e.g., narrow light beam angle) may be directed to a large angle (e.g., wide light beam angle) by a scattering method. In the anti-peep mode, the electrically controlled diffusion film 300 may be disabled so the purpose of the anti-peep can be achieved through the better light collection of the backlight module 10. However, the invention is not limited in this regard.

Figure 14:
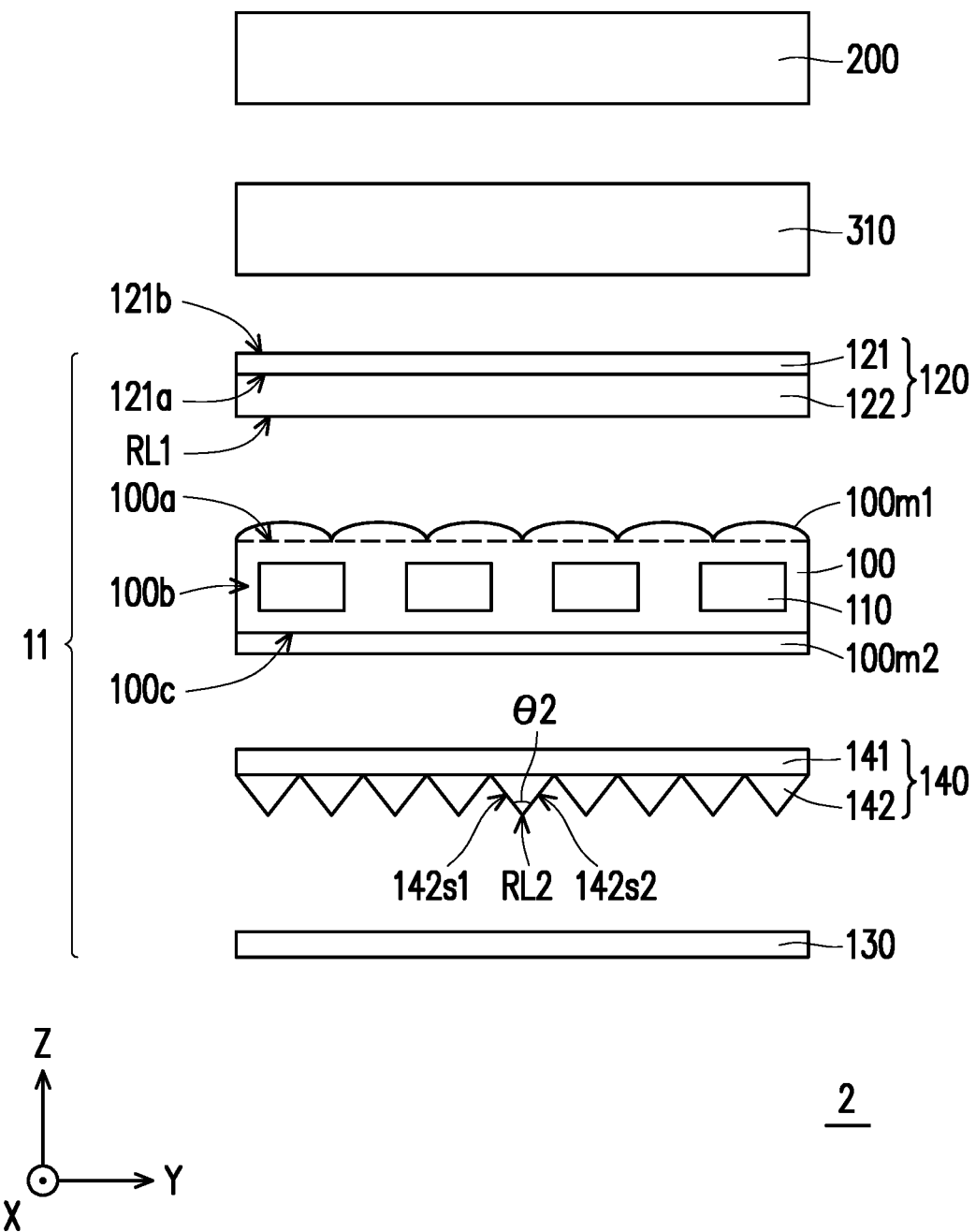
FIG. 14 is a side view of a display apparatus in another embodiment of the invention.

FIG. 14 is a side view of a display apparatus in another embodiment of the invention. Referring to FIG. 4 and FIG. 14, a display apparatus 2 may include the backlight module 11, the display panel 200 and an electrically controlled viewing angle switch 310. The electrically controlled viewing angle switch 310 is overlapped with the display panel 200. More specifically, the display apparatus 2 of this embodiment may also provide the switchable anti-peep function. However, the disclosure is not limited in this regard. In other embodiments, it is also possible that the display apparatus does not have the electrically controlled viewing angle switch 310. In this embodiment, the electrically controlled viewing angle switch 310 may be selectively disposed between the display panel 200 and the prism sheet 120, but the invention is not limited thereto. In another embodiment, the display panel 200 may also be disposed between the electrically controlled viewing angle switch 310 and the prism sheet 120.

For instance, the electrically controlled viewing angle switch 310 may include a liquid crystal cell (not illustrated) and two polarizers (not illustrated) disposed on two opposite sides of the liquid crystal cell. Here, the liquid crystal cell includes a liquid crystal layer (not illustrated) and two electrode layers (not illustrated) located on two opposite sides of the liquid crystal layer. The two electrode layers may be enabled to form an electric field between the two electrode layers. The electric field is configured to drive a plurality of liquid crystal molecules (not illustrated) of the liquid crystal layers to rotate. Accordingly, optical axes of the liquid crystal molecules may be changed according to different electric field sizes and distributions so that the light output of the electrically controlled viewing angle switch 310 at different viewing angles may be adjusted.

In particular, the electrically controlled viewing angle switch 310 has a viewing angle control direction (e.g., the direction Y) perpendicular to an axial direction of optical axes of the liquid crystal molecules, and the display apparatus 2 may electronically control and switch the total light output of a large viewing angle range in this viewing angle control direction. For example, in the anti-peep mode, the total light output of the large viewing angle range may be significantly reduced (or suppressed). In the sharing mode, the total light output of the large viewing angle range may be restored. In particular, the backlight module 11 of this embodiment may improve the total light output of the display apparatus 2 near the normal viewing angle through the better light collection. Further, in cooperation with the electrically controlled viewing angle switch 310 to improve the anti-peep effect, the display apparatus 2 may be switched to the anti-peep mode or the sharing mode. In other words, the backlight module 11 may provide a more preferable anti-peep effect for the display apparatus 2.

Figure 15:
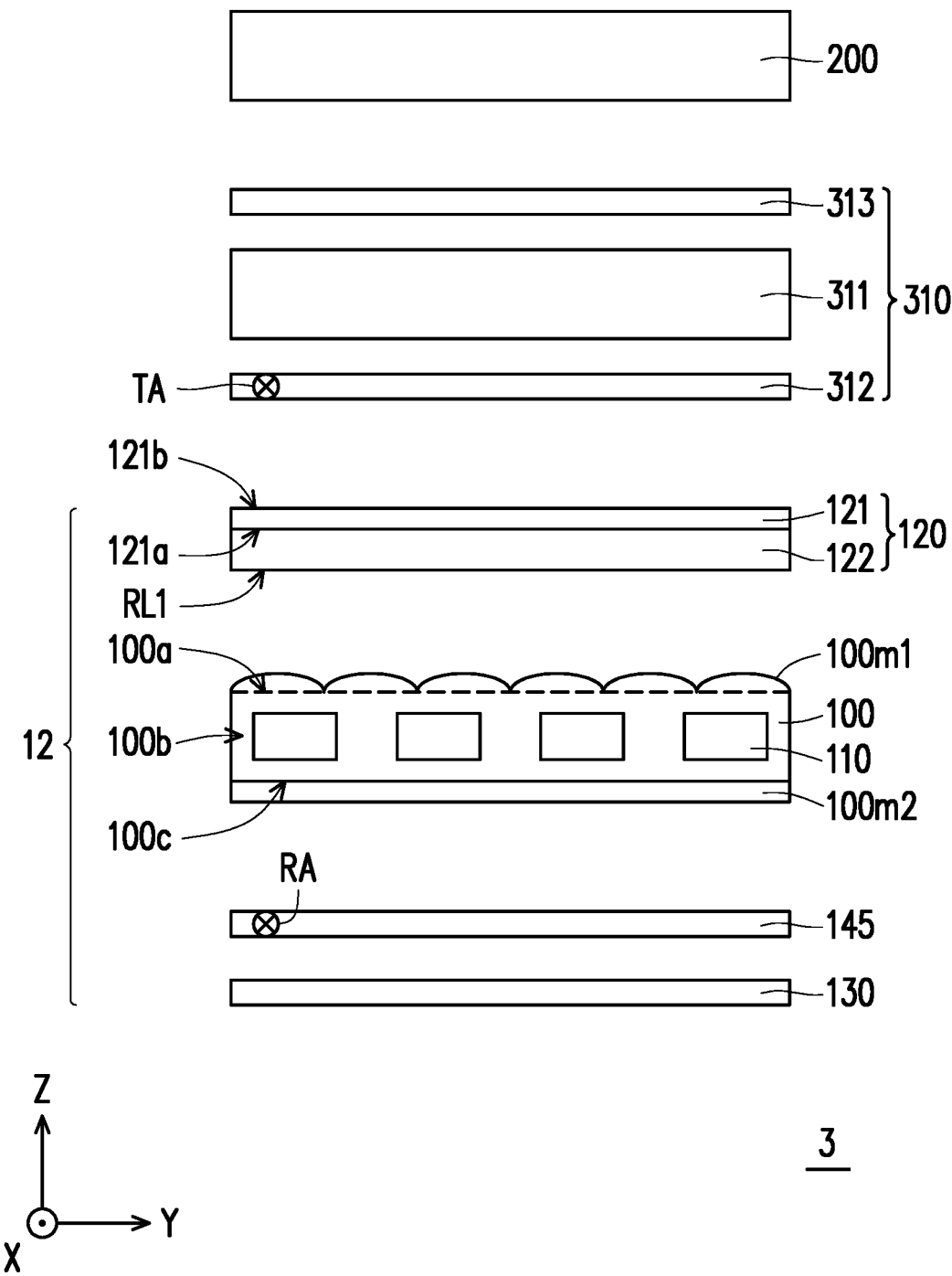
FIG. 15 is a side view of a display apparatus in yet another embodiment of the invention.

FIG. 15 is a side view of a display apparatus in yet another embodiment of the invention. Referring to FIG. 11 and FIG. 15, the major difference between a display apparatus 3 of this embodiment and the display apparatus 2 of FIG. 14 is the different composition of the backlight module. In this embodiment, the electrically controlled viewing angle switch 310 may include a liquid crystal cell 311 and a polarizer 312 and a polarizer 313 disposed on two opposite sides of the liquid crystal cell 311. Here, the liquid crystal cell 311 includes a liquid crystal layer (not illustrated) and two electrode layers (not illustrated) located on two opposite sides of the liquid crystal layer. The two electrode layers may be enabled to form an electric field between the two electrode layers. The electric field is configured to drive a plurality of liquid crystal molecules (not illustrated) of the liquid crystal layers to rotate. Accordingly, optical axes of the liquid crystal molecules may be changed according to different electric field sizes and distributions so that the light output of the electrically controlled viewing angle switch 310 at different viewing angles may be adjusted.

More specifically, the polarizer 312 is located between the liquid crystal cell 311 and the prism sheet 120, and the polarizer 313 is located between the liquid crystal cell 311 and the display panel 200. Because the reflection axis RA of the optical film 145 (e.g., the reflective polarizer) of the backlight module 12 of the display apparatus 3 is perpendicular to the light incident surface 100b of the light guide plate 100, a penetration axis TA of the polarizer 312 of the electrically controlled viewing angle switch 310 also needs to be perpendicular to the light incident surface 100b of the light guide plate 100 (that is, the penetration axis TA of the polarizer 312 is parallel to the reflection axis RA of the optical film 145) so that the light energy utilization of the display apparatus 3 may be maximized. In particular, the backlight module 12 of the present embodiment may improve the total light output of the display apparatus 3 near the normal viewing angle through the better light collection. Further, in cooperation with the electrically controlled viewing angle switch 310 to improve the anti-peep effect, the display apparatus 3 may be switched to the anti-peep mode or the sharing mode. In other words, the backlight module 12 may provide a more preferable anti-peep effect for the display apparatus 3.

Figure 16:
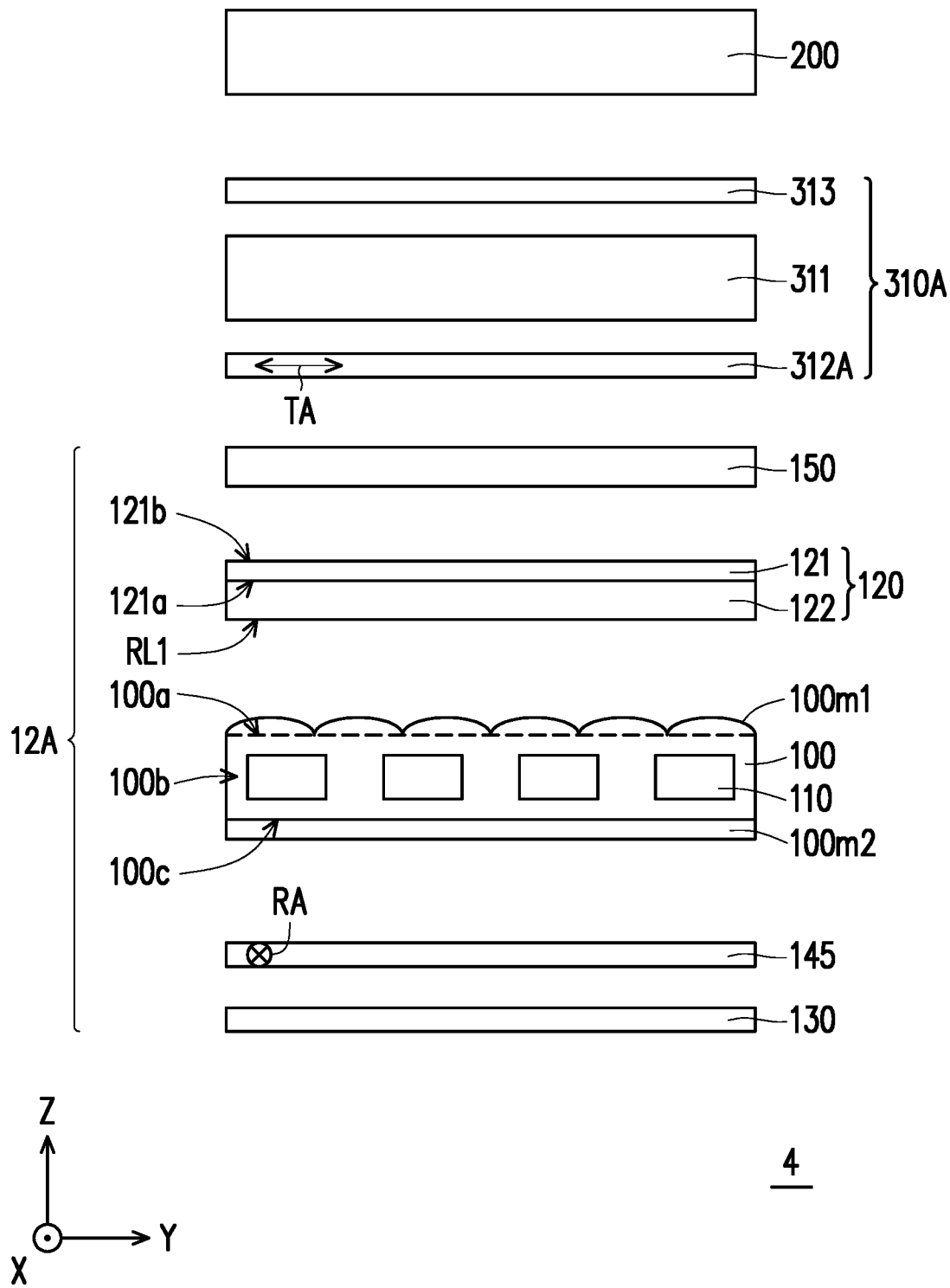
FIG. 16 is a side view of a display apparatus in still another embodiment of the invention.

FIG. 16 is a side view of a display apparatus in still another embodiment of the invention. Referring to FIG. 11 and FIG. 16, the difference between a display apparatus 4 of this embodiment and the display apparatus 3 of FIG. 15 is the different composition of the backlight module and the different axial direction of the penetration axis TA of the polarizer.

In this embodiment, the reflection axis RA of the optical film 145 (e.g., the reflective polarizer) of a backlight module 12A of the display apparatus 4 is perpendicular to the light incident surface 100b of the light guide plate 100. A penetration axis TA of a polarizer 312A of the electrically controlled viewing angle switch 310 is parallel to the light incident surface 100b of the light guide plate 100. Therefore, the backlight module 12A further includes a half wave plate 150, and the half wave plate 150 is disposed between the polarizer 312A and the prism sheet 120.

With the configuration of the half wave plate 150, the light beam emitted from the light emitting surface 121b of the prism sheet 120 and passed through the half wave plate 150 can have a polarization direction parallel to the axial direction of the penetration axis TA of the polarizer 312A so that the light energy utilization of the display apparatus 4 may be maximized. In particular, the backlight module 12A of the present embodiment may improve the total light output of the display apparatus 4 near the normal viewing angle through the better light collection. In other words, the backlight module 12A may provide a more preferable anti-peep effect for the display apparatus 4.

In summary, in the backlight module according to an embodiment of the invention, with the light absorbing sheet disposed on one side of the bottom surface of the light guide plate and the absorption of the light absorbing sheet within the wavelength range of visible light higher than 70%, the influence of the stray light on the light output type of the backlight module may be effectively suppressed to improve the light collection of the backlight module. On the other hand, the light output of the display apparatus using the backlight module in the side view angle can be effectively reduced, thereby improving the anti-peep performance of the display apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising a light guide plate, a light source, a prism sheet, a light absorbing sheet and an optical film, wherein the light guide plate has a light incident surface, a light emitting surface connected to the light incident surface and a bottom surface opposite to the light emitting surface, wherein at least one of the light emitting surface and the bottom surface of the light guide plate is disposed with a plurality of micro lens structures;

the light source is disposed on a side of the light incident surface of the light guide plate;

the prism sheet is overlapped with the light emitting surface of the light guide plate and has a plurality of prism structures facing the light emitting surface, wherein an extending direction of the prism structures is parallel to the light incident surface of the light guide plate;

the light absorbing sheet is disposed on a side of the bottom surface of the light guide plate, wherein an absorbance of the light absorbing sheet within a wavelength range of visible light is higher than 70%; and the optical film is disposed between the light guide plate and the light absorbing sheet, has a plurality of optical micro structures facing the light absorbing sheet, and has a plurality of virtual straight lines, wherein an included angle between a normal projection of each of the plurality of virtual straight lines on the light emitting surface of the light guide plate and the light incident surface of the light guide plate is between 75 degrees and 105 degrees, a normal projection of a ridge line of each of the optical micro structures of the optical film on the light emitting surface of the light guide plate is wavy, and the ridge line is located between two virtual straight lines of the plurality of virtual straight lines.

2. The backlight module according to claim 1, wherein each of the prism structures has a first vertex angle, and an angle of the first vertex angle is between 60 degrees and 75 degrees.

3. The backlight module according to claim 1, wherein a cross-sectional profile of each of the optical micro structures of the optical film is a triangle, a combination of multiple straight line segments, or a combination of a straight line segment and an arc segment.

4. A display apparatus, comprising a display panel and a backlight module, wherein the backlight module is overlapped with the display panel, and comprises a light guide plate, a light source, a prism sheet, a light absorbing sheet and an optical film, wherein the light guide plate has a light incident surface, a light emitting surface connected to the light incident surface and a bottom surface opposite to the light emitting surface, wherein at least one of the light emitting surface and the bottom surface of the light guide plate is disposed with a plurality of micro lens structures;

the light source is disposed on a side of the light incident surface of the light guide plate;

the prism sheet is overlapped with the light emitting surface of the light guide plate and has a plurality of prism structures facing the light emitting surface, wherein an extending direction of the prism structures is parallel to the light incident surface of the light guide plate;

the light absorbing sheet is disposed on a side of the bottom surface of the light guide plate, wherein an absorbance of the light absorbing sheet within a wavelength range of visible light is higher than 70%; and the optical film is disposed between the light guide plate and the light absorbing sheet, has a plurality of optical micro structures facing the light absorbing sheet, and has a plurality of virtual straight lines, wherein an included angle between a normal projection of each of the plurality of virtual straight lines on the light emitting surface of the light guide plate and the light incident surface of the light guide plate is between 75 degrees and 105 degrees, a normal projection of a ridge line of each of the optical micro structures of the optical film on the light emitting surface of the light guide plate is wavy, and the ridge line is located between two virtual straight lines of the plurality of virtual straight lines.

5. The display apparatus according to claim 4, further comprising:

an electrically controlled diffusion film, overlapped with the display panel and located between the display panel and the backlight module.

6. The display apparatus according to claim 4, further comprising:

an electrically controlled viewing angle switch, overlapped with the display panel.

* * * * *